(No Model.) 3 Sheets—Sheet 1.
W. MARTIN.
PIPE COUPLING.
No. 439,022. Patented Oct. 21, 1890.
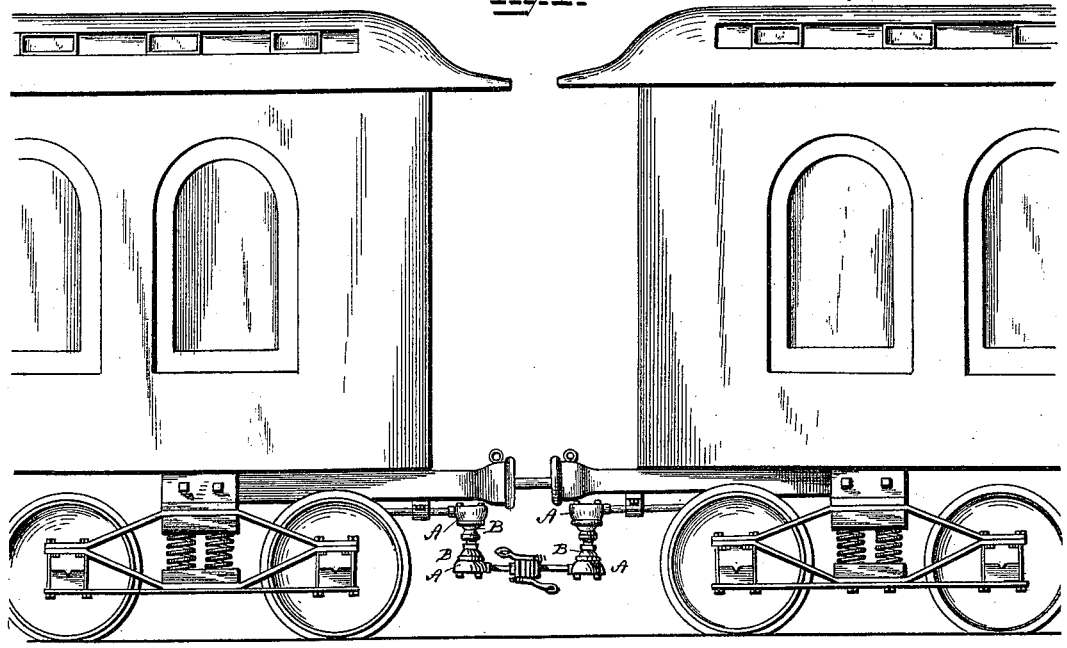
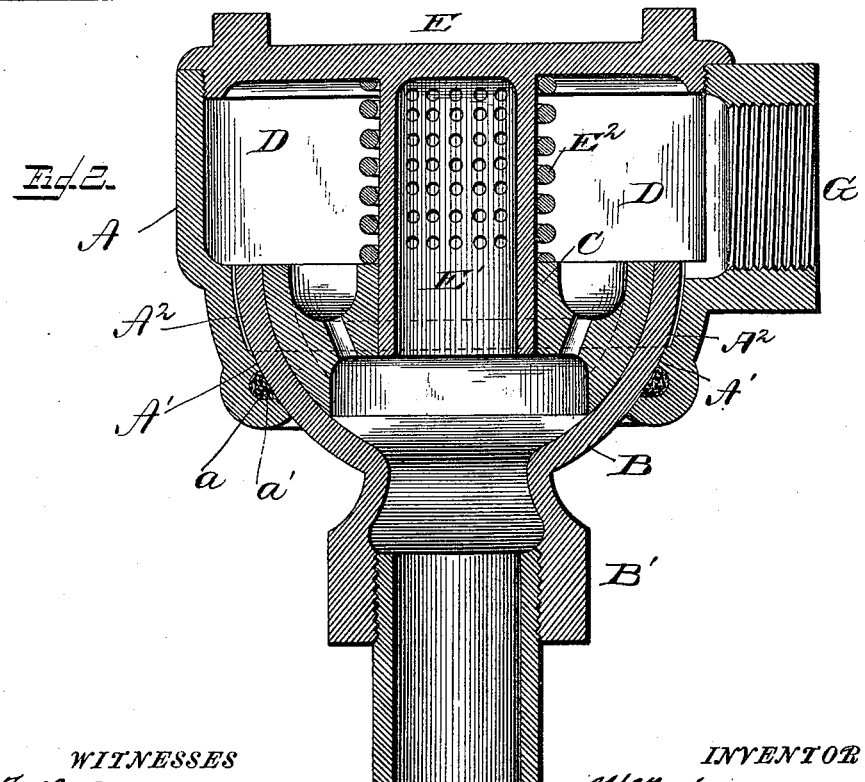
WITNESSES
F. L. Ourand
Alex Mahon
INVENTOR
Wm Martin
by S. W. Grisabargh
Attorney (No Model.) 3 Sheets—Sheet 2.

W. MARTIN.
PIPE COUPLING.

No. 439,022. Patented Oct. 21, 1890.

WITNESSES
INVENTOR
William Martin
Attorney (No Model.) 3 Sheets—Sheet 3.

W. MARTIN.
PIPE COUPLING.

No. 439,022. Patented Oct. 21, 1890.

WITNESSES
P. L. Ourand
Alex Mahr

INVENTOR
Wm Martin
by S. W. Luizobaugh
Attorney

THE NORRIS PETERS CO., PHOTO-LITHO., WASHINGTON, D. C.

UNITED STATES PATENT OFFICE.

WILLIAM MARTIN, OF DUNKIRK, NEW YORK.

PIPE-COUPLING.

SPECIFICATION forming part of Letters Patent No. 439,022, dated October 21, 1890.

Application filed June 13, 1889. Serial No. 314,088. (No model.)

*To all whom it may concern:*

Be it known that I, WILLIAM MARTIN, a citizen of the United States, residing at Dunkirk, in the county of Chautauqua and State of New York, have invented new and useful Improvements in Universal Pipe-Couplings; and I do hereby declare the following to be a full, clear, and exact description of said invention, reference being had to the accompanying drawings, and to the letters of reference marked thereon, which form a part of this specification.

My invention relates to improvements in universal or double ball joint couplings, and is particularly adapted for use with railway-cars for connecting the heating or air pipes between the same.

The invention consists in forming the shell or socket portion in substantially semicircular form, to form a semi-spherical seat for the semi-spherical ball portion of the joint with which one of the pipes is connected, and in holding said ball portion to its seat by means of an inner semi-spherical shell acted upon by a spring.

It further consists in providing the shell or socket with a cap or cover having a perforated tube projecting therefrom and which tube is adapted to pass through the inner semicircular shell, and in mounting upon said tube a spring to engage said cap or cover and the inner shell to force said inner shell and through it the ball portion to its seat in the case or socket.

It further consists in providing the outer shell or socket with a circumferentially-arranged groove on its inner face to receive a packing, and to certain details of construction and arrangements of parts, all as hereinafter described.

Figure 3:
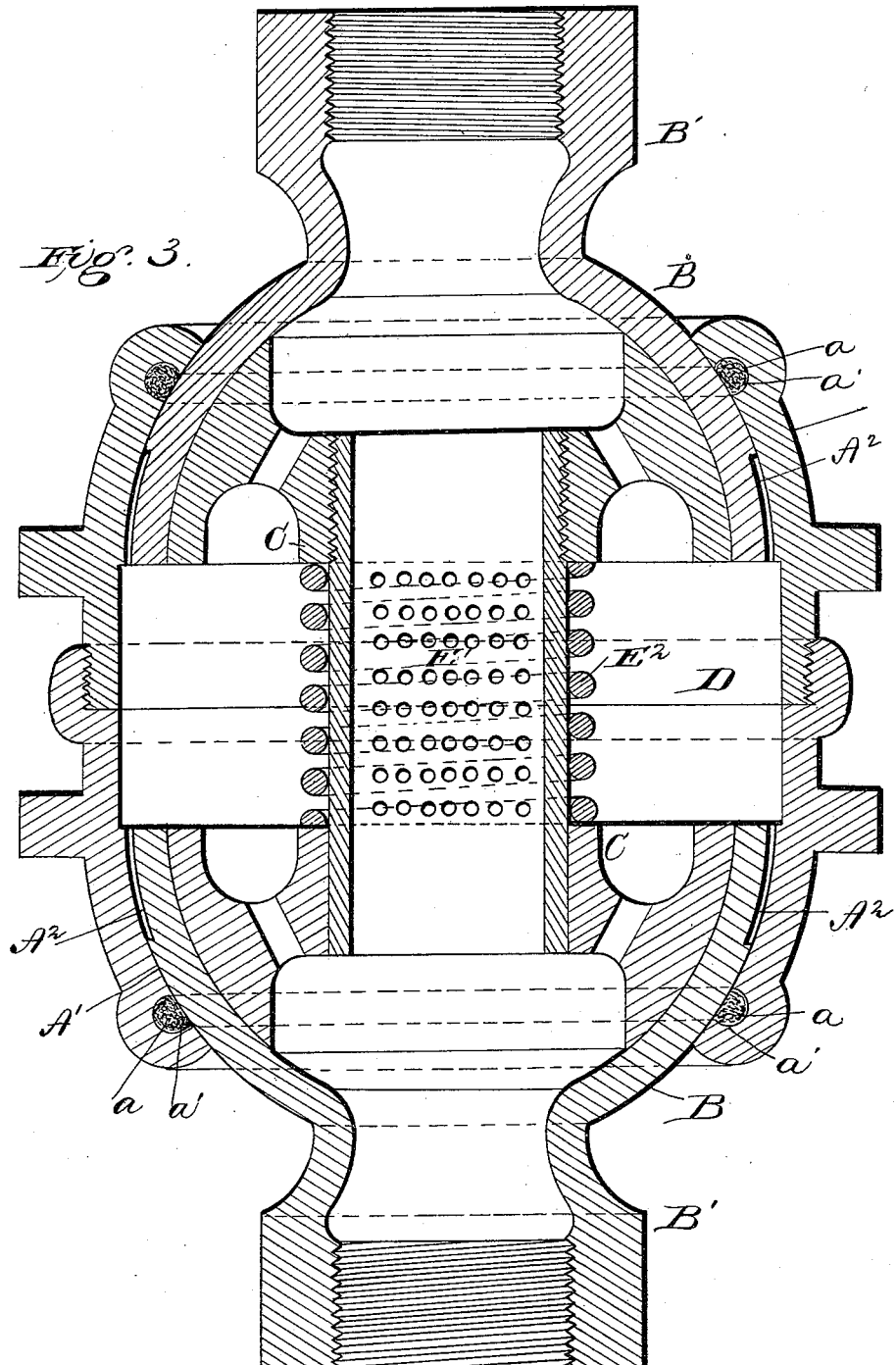
Figure 4:
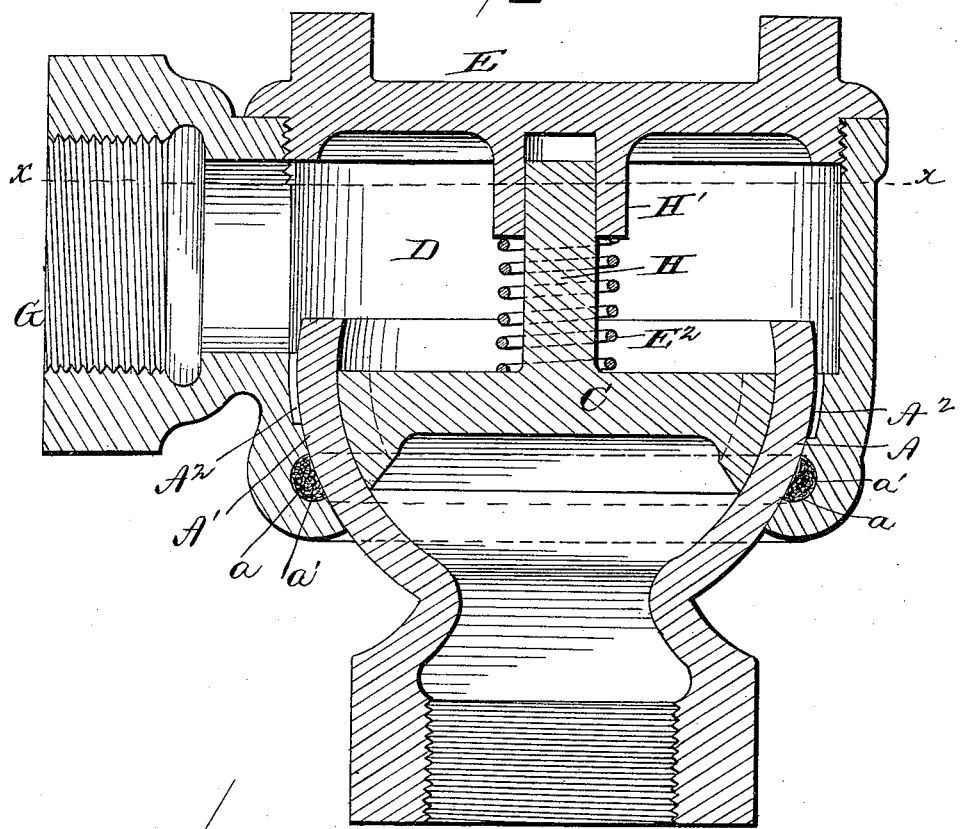
Figure 5:
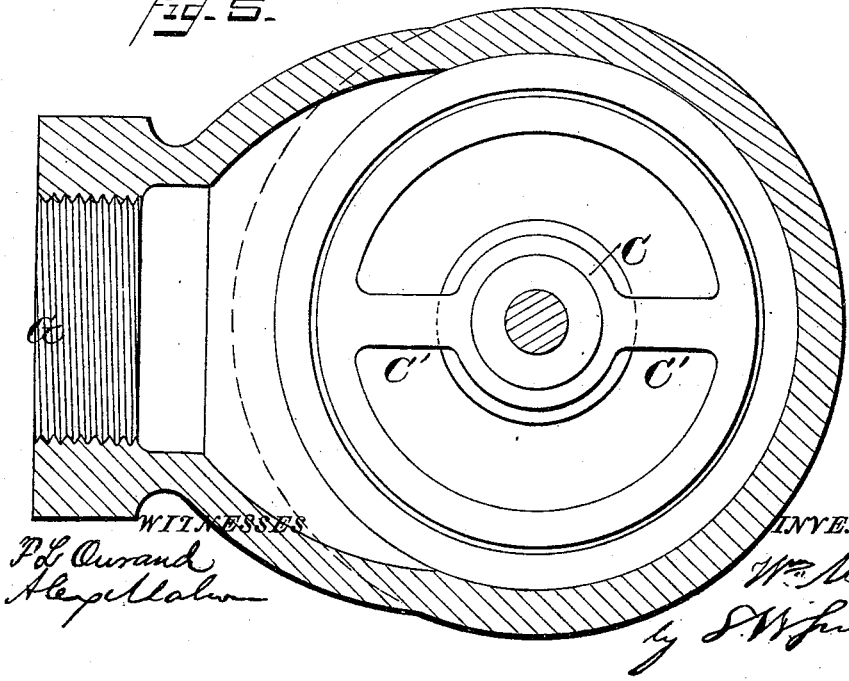

In the accompanying drawings, Figure 1 is a side view of a portion of two railway-cars, showing my improved pipe-coupling applied thereto. Fig. 2 is a transverse section through the coupling as constructed to be applied to railway-cars, with inlet and outlet ports arranged at right angles to each other. Fig. 3 is a modification of the coupling in which a double joint is employed, where the inlet and outlet ports are in line with each other. Fig. 4 is a modification of the device when the inner shell is provided with a shank or stem to engage a socket in the cap or cover; and Fig. 5 is a section of the same, taken on the line $x\,x$, Fig. 4.

The outer shell or socket A is in substantially semi-spherical form, with its inner face stepped, as shown at $A'\,A^2$, forming a seat for the semi-spherical ball portion B, to which one portion of the pipe is connected. The portion $A'$ is curved to fit closely the outer face of the ball portion, and said portion $A'$ is provided with a circumferential groove $a$ to receive a packing $a'$, while the portion $A^2$ is of slightly larger diameter than the ball portion to leave a steam-space between their faces, and by which means I obtain both a packed and steam seat for the ball.

The ball portion B is made in semi-spherical form, and is provided with the internally-screw-threaded shank by which the connecting-pipe $B'$ is secured thereto. The inner shell is composed of the hub portion C, with the radially-arranged spokes $C'$ having their outer faces curved to fit and engage the inner face of the ball portion, as shown, the construction being such that the steam is permitted to pass up through the hub, and also between the spokes, and fill the chamber D with steam or air. A cap or cover E, provided with a suitable external thread upon its peripheral face to engage a corresponding internal thread on the case, and from the center of this cap or cover extends a hollow tubular portion $E'$, cast with or otherwise secured thereto, and which portion extends down and through the hub C of the shell. This hollow tubular portion is provided with numerous holes to permit the steam or air passing into the same to escape or pass to the space or chamber D. Surrounding the hollow tubular portion $E'$ is a spiral spring $E^2$, which engages the cap and the hub C of the inner shell, and serving by the tension thereon to force and hold the inner shell engaged with the ball portion and through it said ball portion to its seat. An opening G is formed in the shell portion to receive the other connecting-pipe.

By the construction and arrangement of parts as above described it will be seen that the steam is all admitted to the space or chamber D and that the entire pressure of the steam is exerted on the ball portion, so that the higher the pressure the tighter it will be forced to its seat and against the packing. The ball may either be provided with a straight opening, as shown, or may be provided with an L, as shall be found desirable and the nature of the case shall require.

Fig. 3 shows a modification of the device, which is adapted for use where the two outlets are on a line with each other, in which case, instead of employing a cap, two semi-spherical shells are used connected together, each provided with a ball and inner-shell portion and in which the tubular portion is screwed into one of the hubs of the inner shells, and the spring engages the two hubs and acting in a similar manner to the construction just described.

In Figs. 4 and 5 the inner shell is shown as provided with a shank or stem H, and the cap or cover is provided with a depending socketed portion H', with which the stem engages, and in which case the spring is mounted on the stem and rests upon the inner shell and against the end of the socket portion H'.

Having now described my invention, what I claim, and desire to secure by Letters Patent, is—

1. In a flexible joint-coupling, the shell or socket portion made in substantially semi-spheroidal form, a semi-spherical ball portion fitting therein, an inner shell, and a spring acting on said inner shell to hold the ball portion to its seat, substantially as described.

2. In a flexible joint-coupling, the shell or socket portion made in substantially semi-spherical form, having its inner face stepped and one of the stepped portions provided with a circumferential packing-groove, a semi-spherical ball portion, and a spring to hold the ball portion to its seat, substantially as described, whereby both a steam and packed joint is formed between the parts, as set forth.

3. In a flexible joint-coupling, the shell or socket having the cap or cover provided with the perforated tube projecting therefrom, a semi-spherical ball portion, an inner semi-spherical shell provided with the hub, and the spring surrounding the tube and engaging the cap and the hub of the inner shell, substantially as described.

In testimony whereof I affix my signature in the presence of two subscribing witnesses.

WM. MARTIN.

Witnesses:
A. J. LUNT,
W. E. CAUSEN.